April 13, 1965 J. A. STEVENSON 3,177,718
TIME AND TEMPERATURE INDICATING APPARATUS
Filed Aug. 5, 1960
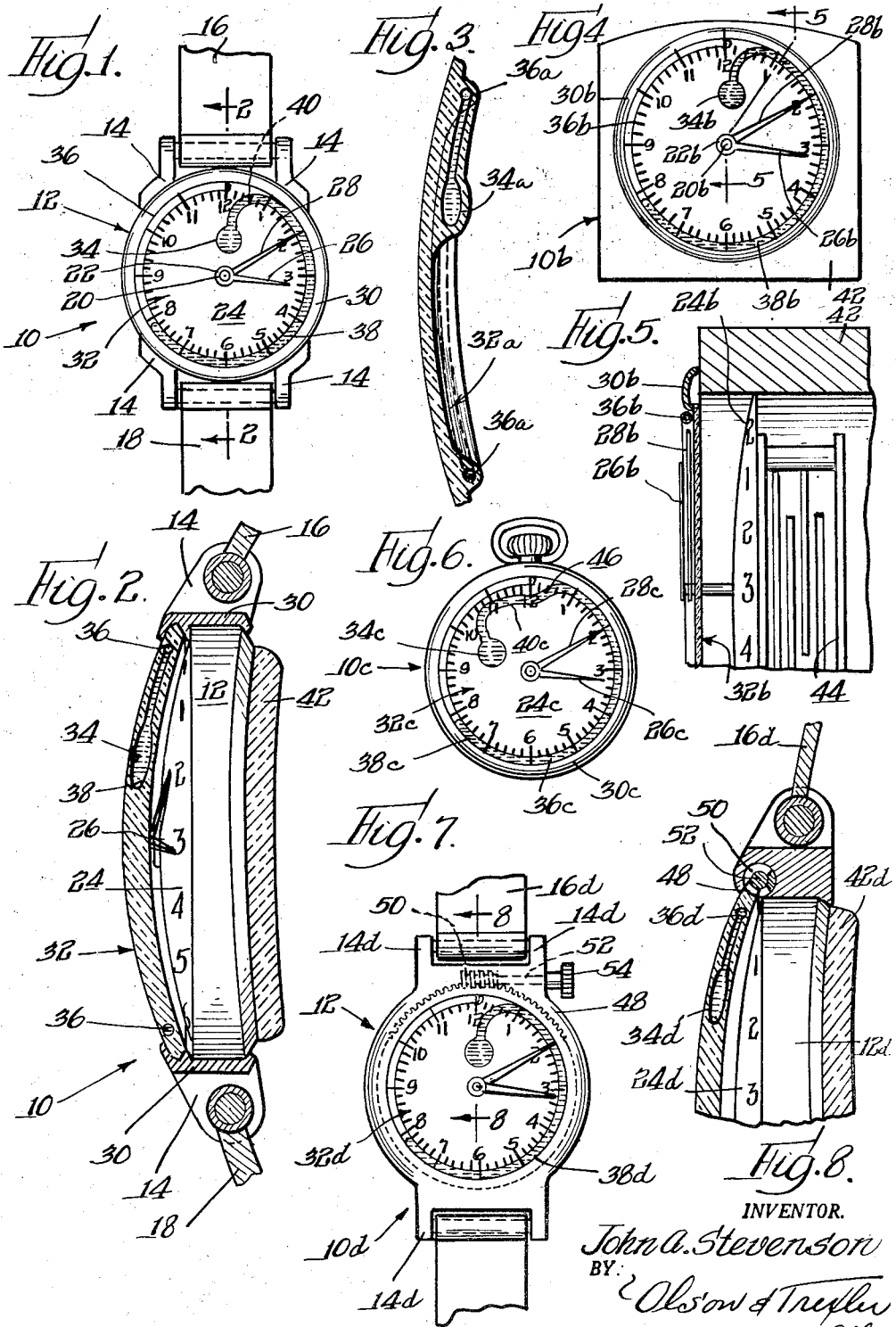
INVENTOR.
John A. Stevenson
BY Olson & Trexler
attys.

ns Patent Office 3,177,718
Patented Apr. 13, 1965

3,177,718
TIME AND TEMPERATURE INDICATING
APPARATUS
John A. Stevenson, 885 Woodbine Lane, Lake Forest, Ill.
Filed Aug. 5, 1960, Ser. No. 47,737
4 Claims. (Cl. 73—344)

This invention relates to improvements in time and temperature indicating apparatus.

In one specific aspect, the present invention relates to a dual time and temperature indicating apparatus adapted for personal use.

Devices for indicating time and atmospheric temperature have heretofore been combined in a single unit. However, separate instruments have been employed for each of the functions; and according to general practice, these separate instruments have been united in a common housing in spaced-apart relationship. Such arrangements have not proved to be completely satisfactory because the separate instruments require individual reading and because the proximate but spaced-apart nature of the two instruments tends to distract a certain amount of attention from the particular instrument being read at a given moment.

Accordingly, an important object of the present invention is to provide new and improved apparatus for indicating time and atmospheric temperature.

A more specific object of the invention is to provide time and temperature indicating apparatus which permits reading the time and the temperature from a single observation.

Another object of the invention is to provide time and temperature indicating apparatus that is adjustable in order to permit calibration of the temperature indication.

A further object of the invention is to provide a novel crystal for installation in existing timepieces to incorporate temperature indicating capabilities.

Additional objects and features of the invention pertain to the particular structure and arrangements whereby the above objects are attained.

A structure in accord with the invention includes a housing; a timepiece mechanism in the housing for showing the progress of time including time indicating hands and a dial-face having time-telling indicia thereon arranged in a closed pattern, the indicia being divided into a plurality of divisions; a transparent cover mounted on the housing over the dial-face; and temperature indicating means on the cover including a tube at least partly shaped similarly to the pattern of the indicia to be situated adjacent thereto, the temperature indicating means further including a temperature responsive fluid in the tube, the linear displacement of the fluid in the tube per incremental change in temperature being selected to coincide with the spacing of the divisions into which the indicia are separated.

The invention, both to its structure and mode of operation, will be better understood by reference to the following disclosure and drawing forming a part thereof, wherein:

FIG. 1 is a front view of a wristwatch constructed in accordance with the invention;

FIG. 2 is an enlarged view taken through the section 2—2 of FIG. 1;

FIG. 3 is a cross-sectional view of a timepiece crystal incorporating temperature indicating means in compliance with the invention;

FIG. 4 is a front view of a table clock constructed in accordance with the invention;

FIG. 5 is an enlarged view taken through the section 5—5 of FIG. 4;

FIG. 6 is a front view of a pocketwatch constructed in accordance with the invention and arranged for indicating temperatures below zero degrees;

FIG. 7 is a front view of a wristwatch constructed in accordance with the invention and arranged to facilitate spatial adjustment between the temperature indicating means and the time-telling indicia for calibrating the means for indicating temperature; and FIG. 8 is an enlarged view taken through the section 8—8 of FIG. 7.

Referring now in detail to the drawing, specifically to the embodiment shown in FIGS. 1 and 2, a timepiece indicated generally by the numeral 10 and constructed in the form of a wristwatch will be seen to comprise a case or housing 12 having two pairs of grips 14 fixed diametrically thereon for use in mounting wristband elements 16 and 18. The housing 12 contains the watch-works or movement, not shown; and concentric shafts, inner shaft 20 and outer shaft 22, extend from the watch-works through the apertured center of a dial-face 24 to have an hour hand 26 and a minute hand 28 fixed respectively thereon for showing the progress of time.

To facilitate reading the time, dial-face 24 is imprinted, embossed or otherwise suitably provided with a number of marks or indicia arranged in a closed pattern, preferably abbreviated, radially extending lines circularly disposed about the periphery of the dial face. These indicia may also include numerals as is well shown in FIGS. 1 and 2. The indicia provided on the dial-face 24 are advantageously graduated into twelve, consecutively enumerated, major divisions, the space devoted to each major division corresponding with the time unit of one hour in compliance with customary practice. In addition, each of the major divisions of indicia is desirably further graduated into five minor divisions, the space devoted to each minor division corresponding with the time unit of one minute.

About the periphery of housing 12, there is affixed a bezel 30 which is usefully employed in securing a transparent cover or crystal 32 over the dial-face 24 protecting the indicia as well as the hands 26 and 28 from damage during use. Crystal 32 is preferably fabricated from clear glass or methyl methacrylate resin; and in compliance with one embodiment of the invention, crystal 32 is molded so as to define within its borders a thermometer bulb 34 communicating with a capillary tube 36. A temperature responsive fluid 38 is filled into the bulb 34 and into the tube 36 in compliance with customary thermometer manufacturing procedures; and the fluid 38 conveniently takes the form of mercury or a suitably dyed methyl alcohol composition.

As will be observed from an inspection of FIG. 1, capillary tube 36 is shaped over a substantial portion of its total length to follow the pattern of the time-telling indicia provided on dial-face 24 closely adjacent to the indicia, radially inwardly or radially outwardly thereof or superposed thereover. So situated, the time-telling indicia on dial-face 24 can be readily utilized in reading the temperature registered by the thermometer comprising bulb 34, tube 36 and the thermally responsive fluid 38.

In accordance with an important feature of the invention, the linear displacement of fluid 38 in tube 36 per two degree change in temperature is selected to coincide with the spacing of the minor divisions which correspond with the time unit of one minute as described hereinabove. Thus, each of the major groups or divisions of the indicia on dial-face 24 will coincide with ten degrees of the temperature scale used in the thermometer.

Advantageously, bulb 34 is offset from the portion of tube 36 aligned with the indicia on dial face 24; and the tail portion 40 of tube 36 which implements this offsetting of the bulb 34 is selected to be spaced radially inwardly from the indicia to preclude reading of erroneous temperatures. In the arrangement of FIGS. 1 and 2, temperature readings begin with ten degrees, preferably ten degrees on the Fahrenheit scale; and it will be observed from the showing of FIG. 1 that a single observation of the timepiece 10 will give a simultaneous reading of time and atmospheric temperature, the specific time shown being ten minutes after three o'clock and the temperature being seventy-nine degrees Fahrenheit.

In compliance with a further feature of the embodiment of FIGS. 1 and 2, a body of thermally insulating material 42 is secured to housing 12 between the housing 12 and the wearer's wrist for purposes of insulating the thermometer incorporated in crystal 32 from conductive contact with the wearer's body heat. Insulation material 42 may take the form of a suitable, foamed resinous substance or an inorganic refractory material.

It is to be noted that crystal 32 is detachably mounted in the timepiece 10 by means of the bezel 30. Accordingly, the crystal 32, provided with a thermometer as described, can be readily substituted for a conventional crystal in the timepiece 10 thereby converting the timepiece to a dual time and temperature indicating apparatus.

In FIG. 3, a modified form of the crystal is shown. Specifically, a crystal 32a has a separately fabricated reservoir bulb 34a fused to its rear surface in communication with a capillary tube 36a which is likewise separately fabricated and fused to the rear surface of the crystal.

In FIGS. 4 and 5, the invention will be seen modified to have a timepiece 10b take the form of a table clock which may readily employ either an electrical or mechanical movement. The timepiece 10b includes a housing 42 fashioned from wood or a suitable resinous plastic. Within housing 42, a frame 44 is mounted to support the clock-works; and a crystal 32b is mounted over a dial-face 24b by means of a bezel element 30b. The crystal 32b is modified by securing a reservoir bulb 34b and a capillary tube 36b on the front face thereof, bulb 34b and tube 36b being desirably adhesively secured to the crystal 32b. The timepiece 10b is otherwise similarly constructed to the timepiece 10. Therefore, like numerals have been used to designate like parts, the suffix letter "b" being added to distinguish those parts associated with the timepiece 10b.

In FIG. 6, a timepiece 10c is shown in the form of a pocketwatch; and the thermometer means provided with the crystal 32c is arranged to permit reading of temperatures below a zero reading. Specifically, the tail portion 40c by which reservoir bulb 34c is connected to the capillary tube 36c is elongated to provide an arcuate section of the capillary tube extending counterclockwise into the area of indicia enumerated eleven and twelve to implement such readings. Advantageously, the portion 40c incorporates a section 46 of reduced internal diameter so that the extreme end of capillary tube 36c can be bypassed while providing compensation for the violation of the arcuate symmetry of the arrangement of the tube 36c.

In other essential respects, the timepiece 10c is arranged similarly to the timepiece 10; and like numerals have been used to designate like parts, the suffix letter "c" being affixed to like enumerated parts in FIG. 6 for purposes of designating that embodiment.

Turning to FIGS. 7 and 8, a timepiece 10d will be seen provided in the form of a wristwatch. In the embodiment of FIGS. 7 and 8, a crystal 32d is rotatably mounted with respect to housing 12d. The crystal 32d is formed with a tooth peripheral portion 48; and a worm gear 50 is operably mounted to the housing 12 to mesh with the tooth portion 48. A shaft 52 extends from gear 50 to have an adjusting knob 54 affixed to its otherwise free end exterior to housing 12.

With the elements so arranged, the thermometer means on crystal 32d can be calibrated by regulating the spatial relationship between the tube and the indicia on dial-face 24b through manual rotation of the crystal 32d utilizing knob 54. If desired, knob 54 may be arranged for selective disengagement with shaft 52 in order to prevent inadvertent rotation of crystal 32d.

Other elements in the embodiment of FIGS. 7 and 8 are similar to the corresponding elements in the embodiment of FIGS. 1 and 2. Accordingly, like numerals have been used to designate like elements in the two figures, the suffix letter "d" being employed to distinguish those elements associated with the embodiment of FIGS. 7 and 8.

While particular embodiments of the invention have been shown, it should be understood, of course, that the invention is not limited thereto since many modifications may be made; and it is, therefore, contemplated to cover by the appended claims any such modifications as fall within the true spirit and scope of the invention.

The invention is claimed as follows:

1. Apparatus for providing simultaneous indication of time and atmospheric temperature by reference to a single closed indicia pattern; and comprising a housing, timepiece means in said housing and including time indicating hand means, transparent cover means mounted on said housing over the time indicating hand means, temperature responsive means associated with said cover means and including a tube with visible temperature responsive fluid therein, and means providing a closed pattern of time-telling indicia visible by means of said transparent cover means and graduated into a plurality of incremental divisions and including hour indicating indicia, said tube being at least partially shaped to lie adjacent and follow the periphery of the pattern of time-telling indicia with the linear displacement of the fluid in said tube per incremental change in temperature being selected to cooperate with the spacing of the divisions making up the time-telling indicia for providing a simultaneous reading of the atmospheric temperature from the time-telling indicia with the hour indicating indicia and the incremental division at the terminal end of the temperature responsive fluid in the tube affording the temperature reading.

2. Apparatus as claimed in claim 1, wherein the tube includes a bulb portion offset relative to the tube whereby to permit the tube to substantially completely follow the periphery of the pattern of the time-telling indicia.

3. Apparatus as claimed in claim 1, wherein there are provided means for regulating the spatial relationship between the temperature responsive means and said indicia.

4. Apparatus as claimed in claim 1, wherein the transparent cover means is rotatably mounted on said housing, and there are provided gear means cooperating with said cover means for rotating said cover means to regulate the spatial relationship between said temperature responsive means and said indicia.

References Cited in the file of this patent

UNITED STATES PATENTS

| | | |
|---|---|---|
| 370,400 | McLean | Sept. 27, 1887 |
| 856,768 | Camins | June 11, 1907 |
| 1,391,878 | Chaney | Sept. 27, 1921 |
| 1,652,838 | Rider | Dec. 13, 1927 |
| 2,035,334 | Mourad | Mar. 24, 1936 |
| 2,112,704 | Mackay | Mar. 29, 1938 |
| 2,763,122 | Hayes | Sept. 18, 1956 |
| 2,874,571 | Hevener | Feb. 24, 1959 |

FOREIGN PATENTS

| | | |
|---|---|---|
| 259,312 | Germany | Apr. 30, 1913 |
| 707,172 | France | July 3, 1931 |
| 1,130,467 | France | Feb. 6, 1957 |